United States Patent [19]

Yoshiyama et al.

[11] 3,896,472

[45] July 22, 1975

[54] AUTOMATIC EXPOSURE CONTROL DEVICE FOR USE IN A PHOTOGRAPHIC CAMERA

[75] Inventors: Ichiro Yoshiyama, Kobe; Kayoshi Tsujimoto, Osaka; Hiroshi Ueda, Nara, all of Japan

[73] Assignee: Minolta Camera Kabushiki Kaisha, Osaka, Japan

[22] Filed: Apr. 1, 1974

[21] Appl. No.: 456,826

[30] Foreign Application Priority Data

Apr. 3, 1973 Japan.............................. 48-38083

[52] U.S. Cl. ..................... 354/29; 354/31; 354/38; 354/43; 354/51; 354/60 R; 354/232; 354/272
[51] Int. Cl. ............................................. G03b 7/00
[58] Field of Search ............ 354/29, 31, 38, 42, 43, 354/49, 50, 60 R, 51, 272

[56] References Cited
UNITED STATES PATENTS

| | | | |
|---|---|---|---|
| 3,687,026 | 2/1972 | Kobayashi et al. | 354/51 |
| 3,824,606 | 7/1974 | Yoshiyama | 354/50 |

*Primary Examiner*—Samuel S. Matthews
*Assistant Examiner*—Russell E. Adams, Jr.
*Attorney, Agent, or Firm*—Watson, Cole, Grindle & Watson

[57] ABSTRACT

In a photographic camera in which the diaphragm aperture for exposure is preset, and the shutter speed for the thus preset diaphragm aperture is automatically controlled with respect to the brightness of a photographic object when at the fully opened diaphragm aperture and also in accordance with the film sensitivity, an automatic exposure control device is so programmed that prior to the commencement of exposure, a determination is made whether the aforesaid automatically controlled shutter speed is higher or lower than a predetermined lower boundary value. If the shutter speed to be automatically controlled is lower than the predetermined lower boundary value, the diaphragm will be maintained in fully open position, without being set to the aforesaid predetermined diaphragm aperture, so as to automatically obtain the proper shutter speed in accordance with the brightness of a photographic object and the film sensitivity, whereby the exposure is then effected.

13 Claims, 3 Drawing Figures

AUTOMATIC EXPOSURE CONTROL DEVICE FOR USE IN A PHOTOGRAPHIC CAMERA

BACKGROUND OF THE INVENTION

This invention relates to automatic exposure control devices for use in photographic cameras, and more particularly to such an automatic exposure control device wherein there is avoided the possibility of effecting photography at a predetermined shutter speed such as a lower boundary shutter speed at which vibration of the hand-held camera will not affect the exposure, or at a shutter speed lower than the boundary shutter speed.

Automatic exposure control devices for use in a photographic camera are known wherein a diaphragm aperture is preset, and a shutter speed is automatically controlled according to the brightness of a photographic object and the film sensitivity.

It is also known that in such automatic exposure control devices if the shutter speed to be automatically controlled is lower than a specific shutter speed, a warning will be given that hand-held camera vibration will affect the exposure.

In the case of such a warning, it is necessary that the determined diaphragm aperture be re-set to a diaphragm aperture of a higher value, and further to detect whether or not it is possible to automatically control the shutter speed, commensurate with the brightness of a photographic object when at the diaphragm aperture value thus re-set and a given film sensitivity the shutter speed is such that there is no vibrational effect of the hand-held camera.

This is cumbersome for a photographer, and in addition a chance to make a photograph may be missed, especially when the moving speed of a photographic object momentarily changes.

It is accordingly a primary object of the present invention to provide a photographic camera, wherein a preset diaphragm aperture value is expected to be given an exposure time longer than a predetermined value, and the preset diaphragm aperture value is automatically adjusted for effecting photography.

Another object of the present invention is to provide an automatic exposure control device for use in a photographic camera, wherein a photographer is permitted to select, at his discretion, the lowest shutter speed which gives no vibrational effects of a hand-held camera.

A further object of the present invention is to provide an automatic exposure control device for use in a photographic camera, wherein with respect to a preset diaphragm aperture, comparison is made between the shutter speed to be automatically controlled according to the brightness of a photographic object and the film sensitivity and the shutter speed selected by a photographer. When the shutter speed to be automatically controlled is detected to be lower than the shutter speed selected by the photographer, the diaphragm is maintained in its fully open position, without being set to the preset diaphragm aperture at the time of exposure. Then the shutter speed is automatically controlled according to the brightness of a photographic object when at the fully opened diaphragm aperture and the film sensitivity, thereby effecting the exposure.

A still further object of the present invention is to provide a programmed automatic exposure control device for use in a lens-exchangeable camera, wherein the diaphragm aperture is preset before the exposure, and the shutter speed is automatically controlled, commensurate with the brightness of a photographic object with respect to the aforesaid preset diaphragm aperture, commensurate with the brightness of a photographic object when at the fully opened diaphragm aperture. Then a determination is made whether the shutter speed to be automatically controlled according to the brightness of a photographic object when at the aforesaid preset diaphragm aperture and the film sensitivity is higher or lower than that shutter speed selected by a photographer. If the former is detected to be equal or higher than the latter, the diaphragm is set to the preset diaphragm aperture at the time of exposure, thereby automatically controlling the shutter speed. While if the shutter speed to be controlled is detected to be lower than the selected shutter speed, the shutter speed is automatically controlled with the diaphragm being maintained fully open.

These and other objects and features of the present invention will be apparent from the ensuing part of the specification in conjunction with drawings which indicate an embodiment of the invention.

SUMMARY OF THE INVENTION

According to the present invention, with respect to a diaphragm aperture preset prior to the commencement of the exposure, it is first determined whether the shutter speed to be controlled according to the brightness of a photographic object and the film sensitivity is higher or lower than the lower boundary shutter speed which would produce no vibrational effects of the hand-held camera. If the former shutter speed is detected to be higher than the lower boundary shutter speed, a diaphragm actuating member is operated to set the diaphragm from its fully open position to the aforesaid preset diaphragm aperture, and then the exposure will be commenced. Thus the exposure is effected at a shutter speed automatically controlled according to the brightness of a photographic object when at the diaphragm aperture value thus preset and the film sensitivity. However, in case the shutter speed to be controlled is detected to be lower than the specific lower boundary shutter speed described, the exposure is effected with the diaphragm being maintained in its fully open position, without causing the operation of the diaphragm actuating member serving to bring the diaphragm from its fully open position to the preset diaphragm aperture. Thereby, the shutter speed is automatically controlled according to the brightness of a photographic object with the diaphragm aperture at its fully open position, and also in accordance with the film sensitivity.

The lower boundary shutter speed which produces no vibrational effects of the hand-held camera is not of a fixed nature but varies from 1/15 to 1/30 second, and depends upon the photographing techniques and experience of individual photographers. Such values of shutter speed are different to a large extent between the skilled photographers and the less-experienced photographers. In addition, if the camera used is of a lens-exchangeable type, the length and weight of an objective lens to be mounted on the camera will vary according to whether a telephoto-lens or a wide-angle lens is mounted thereon. Accordingly, the value of lower boundary shutter speed which produces no vibrational effects of the hand-held camera varies for the same photographer. Generally, in case an objective lens of a long focal distance is mounted on the camera, the value of shutter speed which produces vibrational effects of the hand-held camera will be increased.

To attain those objects described, according to the present invention, there is provided an automatic exposure control device for use in a lens-exchangeable type photographic camera. The automatic exposure control device comprises a member for presetting a diaphragm aperture prior to the exposure, a member for selecting and setting the lower boundary shutter speed, and an electric circuit including light measuring means and detecting means. The light measuring means produces outputs in response to the brightness of a photographic object and the film sensitivity, which outputs depend upon the preset value of the diaphragm aperture. The outputs to be produced in the light measuring means varies according to the aforesaid selected shutter speed. When the detecting means compares the level of outputs produced in the light measuring means with the level of outputs for the selected shutter speed, and detects that a shutter speed to be automatically controlled according to the brightness of a photographic object and the film sensitivity when at the preset diaphragm aperture is lower than the selected shutter speed, then the diaphragm actuating member remains inoperative so as to maintain the diaphragm aperture in the fully open condition. The diaphragm actuating member closes the diaphragm from its fully open position to a diaphragm aperture preset prior to the exposure. Thus, the shutter speed is automatically controlled according to the brightness of a photographic object and the film sensitivity with a fully opened diaphragm aperture.

The primary feature of the automatic exposure control device of the present invention resides in that a first exposure control and a second exposure control are programmed. The first exposure control effects an automatic control of the shutter speed according to the brightness of a photographic object and the film sensitivity. The brightness is that obtained with the diaphragm set to a preset diaphragm aperture. The second exposure control effects an automatic control of the shutter speed according to the brightness of a photographic object with the diaphragm aperture fully opened and in accordance with the film sensitivity.

The second feature of the device resides in that the aforesaid first exposure control is so programmed that the shutter speed to be controlled may not be lower than a selected shutter speed. The third feature of the device is that the shutter speed may be fully selected at the discretion of the photographer.

The fourth feature is that the light measurements are effected twice, the first being effected to determine whether the diaphragm is to be maintained open or the diaphragm is to be set to a preset diaphragm aperture. The second light measurement is effected for controlling the exposure.

Accordingly, in the first exposure control for automatically controlling the shutter speed according to the brightness of a photographic object when at a preset diaphragm aperture, if the shutter speed to be automatically controlled is lower than that shutter speed selected for preventing vibrational effects of the hand-held camera, the second exposure control is effected for automatically controlling the shutter speed with the diaphragm maintained open. In that case, the programming for switching from the first exposure control to the second exposure control is conducted in accordance with that shutter speed selected by the photographer.

Thus, a shutter speed to be selected depends upon the photographing skill of the photographer, the type of camera used, and the exchangeable lens to be mounted on the camera where the camera used is of the lens-exchangeable type. A preset diaphragm aperture may be used for a certain range of brightness of a photographic object. However, in case the aforesaid preset diaphragm aperture is desired to control a shutter speed lower than that shutter speed which will cause vibrational effects of the hand-held camera, the diaphragm is automatically turned to a fully open condition, so as to control the proper shutter speed.

BRIEF DESCRIPTION OF THE DRAWINGS:

The accompanying drawings illustrate a preferred embodiment of the present invention, wherein.

DETAILED DESCRIPTION OF THE PREFERRED EMBODIMENT

Figure 1:
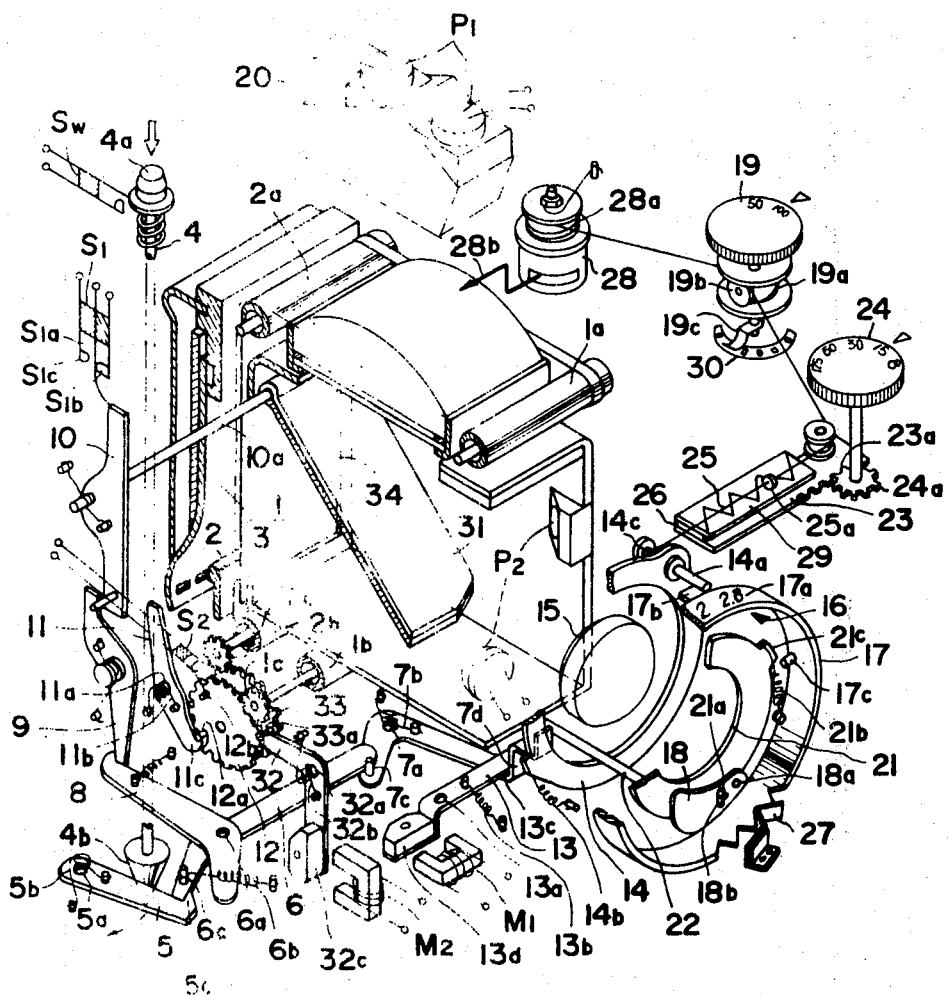
FIG. 1 is a perspective view illustrating a cross section of an essential part of the embodiment.

FIG. 1 illustrates a lens-exchangeable type single lens reflex camera relating to the present invention and equipped with a focal plane shutter. Front curtain 1 and rear curtain 2 of a focal plane shutter have their respective ends wound around film winding shafts 1a, 2a and around film taking-up shafts 1b and 2b, such that each curtain travels vertically in front of film 3. Shown at 17 is a diaphragm adjusting ring, which is rotatable with respect to an exchangeable lens barrel (not shown) and includes thereon graduations 17a showing the values of diaphragm aperture. If the ring 17 is rotated so as to align one of graduations 17a with index 16 provided on the lens barrel, the ring 17 is locked with its graduation aligned with the index by click 27. Projection 17b projecting from the circumference of ring 17 engages pin 14a of diaphragm connecting ring 14, which is rotatably mounted on a camera body about the optical axis of the objective lens and is biased to be rotated in the counterclockwise direction, as viewed in FIG. 1, by spring 14 b. If diaphragm aperture adjusting ring 17 is rotated in the clockwise direction, so as to set the diaphragm from its fully open position to a closing position, then diaphragm connecting ring 14 is caused to rotate in the clockwise direction against the force of spring 14b. Diaphragm actuating ring 21 is rotatably mounted on the lens barrel and provided with a plurality of actuating pins 21a (only a single pin is shown in the drawing), each of which is loosely fitted in engaging relation in a slot 18b provided in each shutter blade 18 (only a single blade is shown) which is pivotally mounted by shaft 18a at the diaphragm plane. The diaphragm actuating ring 21 is biased to be rotated in the clockwise direction by spring 21b. The rotation in the clockwise direction of the diaphragm actuating ring is stopped when the radially projecting pawl 21c thereof engages pin 17c provided on an inner periphery of diaphragm adjusting ring 17 and projecting radially inwardly thereof.

Mounted rigidly on diaphragm actuating ring 21 is connecting pin 22 which extends to the inside of the camera body until its one end engages angled portion 7d of diaphragm actuating lever 7. Fixedly attached at one end to pin 14c of diaphragm connecting ring 14 is wire 25, to which is fixedly attached sliding element 25a, which is slidable on and along a first sliding resistor 29 rigidly mounted on movable plate 23 provided with teeth 23a, thereby constituting a first variable resistor R1 together with first sliding resistor 29. The first sliding resistor 29 has contacting piece 26 thereon.

Supported rotatably by a shaft on the camera body is film sensitivity setting dial 19, which is manipulated by rotating and has rotatable pulley 19b supported by shaft 19a. Sliding element 19c projects from shaft 19a integrally therewith and is slidable on a second sliding resistor 30, thereby constituting a second variable resistor together with second sliding resistor 30. Wire 25 extends around the aforesaid pulley 19b and then around shaft 19a with its other end wound about taking-up shaft 28a provided coaxially with meter 28. The meter 28 is rotatably mounted on the camera body and is biased to be rotated in the counterclockwise direction.

Thus, if film sensitivity setting dial 19 is rotated to set the film sensitivity, the rotation causes the motion of the other end of wire 25, without causing the shift of sliding element 25a, such that meter 28 will be rotated to shift its pointer 28b from a zero point in the finder, and at the same time, the resistance of the second variable resistor R2 will be changed.

Mounted by a shaft on the camera body is dial 25 for selecting the lowest shutter speed, and which is rotatable and has thereon graduations indicating the shutter speed. Dial 24 has gear 24a provided coaxially therewith and meshing with teeth 23a of movable plate 23. Accordingly, the resistance of first variable resistor R1 varies according to the diaphragm aperture preset by diaphragm aperture adjusting ring 17 as well as the lowest shutter speed selected by the use of dial 24.

Connected to shutter button 4a is release rod 4 which extends downwardly within the camera body in a manner to be vertically movable therein and has weight 4b mounted at its lower end, with shutter button 4a biased upwardly with respect to the camera body by a spring force. First locking lever 5 is mounted rotatably by shaft 5a on the camera body and is biased in the counterclockwise direction by spring 5b. First locking lever 5 has pawl 5c engageable with one end of intermediate lever 6, which is supported by shaft 6a and biased in the counterclockwise direction by spring 6b. When pawl 5c engages intermediate lever 6, the pawl will lock the intermediate lever, so as to no longer rotate it. Intermediate lever 6 has one end provided with pin 6c, which is engageable with second locking lever 8 when intermediate lever 6 is rotating. The other end of intermediate lever 6, when the lever is in the locked condition, engages pin 7c of diaphragm actuating lever 7, thereby locking it.

Diaphragm actuating lever 7 is rotatably mounted on the camera body by a shaft through shaft hole 7a and biased in the clockwise direction by spring 7b. Angled portion 7d of lever 7 is in engagement with connecting pin 22 as shown. Detecting lever 13 is provided with a cut-away portion 13c engageable with angled portion 7d. The detecting lever is rotatably mounted on the camera body by a shaft projecting through hole 13a, and biased to be rotated in the clockwise direction by spring 13b. The detecting lever has armature 13d mounted on one end thereof, such that when first electromagnet M1 fixed on the camera body is excited, detecting lever 13 will be rotated in the counterclockwise direction against the force of spring 13b, thereby disengaging the cut-away portion 13c from angled portion 7d.

Mirror lever 10 engaging another intermediate lever 9 has shaft 10a, on one portion of which is rigidly mounted movable mirror 31. Intermediate lever 9 is in the locked condition, despite its tendency of being rotated in the clockwise direction, by second locking lever 8. Rotatably journaled by a shaft through shaft-hole 11a on the mirror box is front curtain locking lever 11 which is brought into engagement with mirror lever 10, to thereby be rotated in the clockwise direction when the mirror lever is urged in the counterclockwise direction. Front curtain locking lever 11 is biased to be rotated in the counterclockwise direction by spring 11b. Front curtain locking lever 11 is formed with pawl 11c at its tip, which pawl is engageable with pin 12a of front curtain gear 12, which in turn meshes with pinion 1c fixedly mounted on front curtain take-up shaft 1b, such that front curtain 1 will be locked due to the engagement of pawl 11c with pin 12a.

Rear curtain locking lever 32 has armature 32c facing second electromagnet M2 fixedly attached on the camera body and is rotatably mounted on the mirror box by a shaft through hole 32a. Rear curtain locking lever 32 is biased to be rotated in the clockwise direction by spring 32b and has one arm engageable with pin 33a of rear curtain gear 33 which meshes with pinion 2c rigidly mounted on rear curtain take-up shaft 2b. When second electromagnet M2 is excited, rear curtain locking lever 32 will be rotated in the counterclockwise direction against the force of spring 32b, thereby disengaging it from pin 33a.

Disposed on the mirror box is penta-prism 20 of the view finder, which has first photoconductive element P1. A second photoconductive element P2 is disposed within the mirror box confronting exposure frame 34 and in a position not to interfere with the formation of an image on film 3 framed by exposure frame 34, by the scene light passing through objective lens 15.

Switch Sm is a potential source switch, which is normally maintained open and closed when release button 4a is depressed downwardly. Switch S1 is a changeover switch having movable contact S1a which engages mirror lever 10, movable contact S1a being brought into contact with contact S1b when movable mirror 31 is in the viewing position as shown in the drawing, and turned to connect to contact S1c when movable mirror 31 is rotated to the picture taking position. Switch S2 is a timing switch, which is normally maintained open and has movable contact engageable with pin 12b of the front curtain gear. When front curtain 1 is in the cocked position, both the movable contact and pin 12b are brought into engagement, thereby closing switch S2. Upon the commencement of the shift of front curtain 1 from the cocked position to the rest position, switch S2 is opened.

Figure 2:
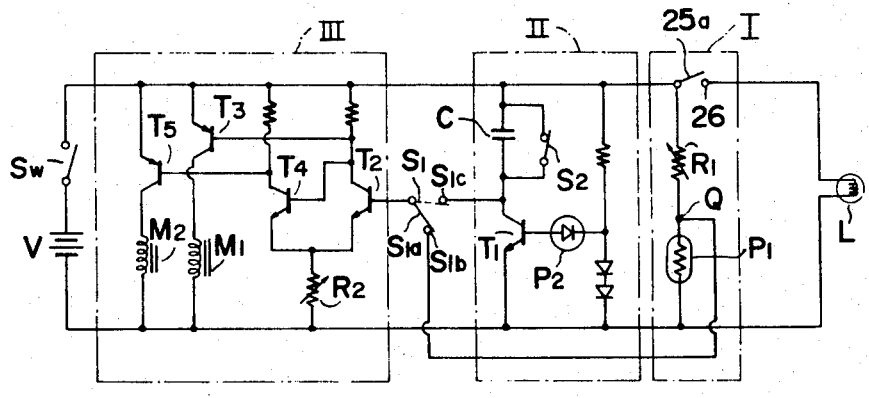
FIG. 2 is a diagram of an automatic exposure control circuit incorporated in the embodiment.

FIG. 2 diagrammatically shows an electric control circuit incorporated in the embodiment described above, wherein components corresponding to those of FIG. 1 are shown by the identical reference numerals. A block encircled with dotted line I is a light measuring circuit, wherein in case the diaphragm is to be set to a preset diaphragm aperture, comparison is made between the shutter speed to be automatically controlled according to the brightness of a photographic object, the film sensitivity, and the lowest shutter speed selected by means of dial 24, so as to detect whether or not the former is higher than the latter. A block enclosed by dotted line II is a light measuring and timing circuit for controlling the shutter in case of the exposure. A block enclosed by dotted line III is a switching circuit for actuating the shutter.

Movable contact S1a of change-over switch S1, as set forth, contacts with contact S1b when movable mirror 31 is in the viewing position, such that detecting light measuring circuit I may be connected to switching circuit III. When movable mirror 31 is rotated from the viewing position to the picture taking position, movable contact S1a is switched to contact S1c, such that light measuring and timing circuit II may be connected to switching circuit III.

Potential source V is connected through potential source switch Sw to first variable resistor R1 and first photoconductive element P1 in detecting circuit I, thereby completing a series circuit. For ensuring light measurement for detection prior to the exposure by the first photoconductive element P1, that element is formed of a photoconductive element such as Cds and is disposed on penta-prism 20 in a manner to receive the scene light coming through the objective lens and entering the view finder optical system, as shown in FIG. 1.

The resistance of first variable resistor R1 is determined according to the diaphragm aperture value set by means of diaphragm aperture adjusting ring 17 and the lowest shutter speed selected by dial 24, as set forth with reference to FIG. 1. The potential source voltage V applied through first variable resistor R1 as well as first photoconductive element P1 is fed through junction point Q to contact S1b and then through change-over switch S1 to a base of input transistor T2 in switching circuit III. Input transistor T2 has an emitter, to which is connected second variable resistor R2, whose resistance depends on the film sensitivity. The collector of input transistor T2 is connected to the base of transistor T3, to a collector of which is connected first electromagnet M1.

In detecting light measuring circuit I, sliding element 25a and contacting piece 26 constitute a switch for making or breaking the connection between warning lamp L and potential source V. When sliding element 25a is turned to contact with contacting piece 26, warning lamp L is lit, so as to give a warning that the preset diaphragm aperture is marginal, because such a preset diaphragm aperture is subject to restriction by the lowest shutter speed selected.

In light measuring and timing circuit II, second photoconductive element P2 is positioned to confront exposure frame 34, as illustrated, so as to receive the scene light incident upon film 3 and reflected thereon, which scene light comes through the objective lens when the shutter is released, and so as to receive light rays reflected upon a reflecting surface of front curtain 1 of the focal plane shutter, which reflecting surface faces objective lens 15 and has a reflecting characteristic the same as the sensitive film 3, as taught for example in the specification of U.S. Pat. No. 3,687,026, Column 3, line 50 to Column 4, line 31. Thus, second photoconductive element P2 comprises a photoconductive element, such as a photovoltaic cell, readily responsive to light. The second photoconductive element is connected as an input to the base of transistor T1, to the collector of which is connected capacitor C and timing switch S2, both of which are parallelly connected and constitute a timing circuit. The collector potential of transistor T1 is connected to contact S1c, such that when movable contact S1a of change-over switch S1 is connected to contact S1c, as shown by a dotted line, the collector will be connected to the base of input transistor T2 in switching circuit III, thereby causing, through transistors T4 and T5, the actuation of the second electromagnet connected to transistor T5.

With the circuit as described above, if shutter release button 4a is depressed downwardly, then potential source switch Sm is closed, whereby voltage is applied at junction Q, between the first variable resistor R1 and first photoconductive element P1, and provided as an input through change-over switch S1 to transistor T2. At this time, the operating voltage of switching circuit III is set to a certain level by second variable resistor R2 according to the film sensitivity, and thus the actuation of first electromagnet M1 is determined according to whether or not the potential determined by first variable resistor R1 and first photoconductive element P1 is higher than the operating voltage of switching circuit III. The resistance of first variable resistor R1 is determined by the position of sliding element 25a relative to first sliding resistor 29 according to both the diaphragm aperture set by diaphragm aperture adjusting ring 17 and the lowest shutter speed selected by dial 24. The resistance of first photoconductive element P1 is determined according to the brightness of the photographic object.

If the photographic object is bright enough, and if the shutter speed to be automatically controlled with respect to the preset diaphragm aperture is not lower than the lowest shutter speed selected, the potential at junction point Q is low, such that transistor T3 is conductive, thereby exciting first electromagnet M1. Thus, armature 13d is attracted to first electromagnet M1, whereby detecting lever 13 is rotated in the counterclockwise direction against the force of spring 13b, thereby disengaging cut-away portion 13c from angled portion 7d.

If shutter release button 4a is further depressed so that weight 4b engages first locking lever 5, it is rotated in the clockwise direction, to thereby disengage pawl 5c from intermediate lever 6, whereby intermediate lever 6 is urged in the counterclockwise direction, thereby releasing diaphragm actuating lever 7 from its locked position. Consequently, diaphragm actuating lever 7 is rotated in the clockwise direction by spring 7b, whereupon angled portion 7d is caused to shift leftwards. This permits diaphragm actuating ring 21 to rotate in the clockwise direction by spring 21b, until pawl 21c is brought into engagement with pin 17c, whereby diaphragm blades 18 are turned from their fully open position and closed to a preset diaphragm aperture.

Simultaneously with the aforesaid movement, intermediate lever 6 releases intermediate lever 9 which has been locked by second locking lever 8. Mirror lever 10 rotates in the counterclockwise direction, thereby urging movable mirror 31 from the viewing position to the picture taking position. Simultaneously, change-over switch S1a is switched from the position shown by a solid line in FIG. 2 to the position shown by a dotted line. The rotation of mirror lever 10 is stopped when it engages front curtain locking lever 11, whereby pawl 11c of lever 11 becomes disengaged from pin 12a of front curtain gear 12. Upon the commencement of rotation of front curtain gear 12, pin 12b opens timing switch S2 and the exposure by means of front curtain 1 starts.

Simultaneously with the opening of timing switch S2, the scene light passing through objective lens 15 and the diaphragm set to a preset diaphragm aperture are reflected on the surface of front curtain 1 and film surface 3 to enter second photoconductive element P2. Capacitor C is charged according to the light quantity measured by second photoconductive element P2. When the voltage of capacitor C reaches a level at which switching circuit III operates, transistor T5 which has been maintained non-conductive is rendered conductive, thereby exciting second electromagnet M2. Due to the excitation of second electromagnet M2, rear curtain locking lever 32 rotates in the counterclockwise direction, thereby disengaging its arm from pin 33a of rear curtain gear 33, whereby rear curtain take-up shaft 2b is rotated for interrupting the exposure.

In case the brightness of the photographic object is comparatively low, and the shutter speed to be automatically controlled with respect to the preset diaphragm aperture is lower than the lowest shutter speed selected, the potential at junction Q is high, such that transistor T3 is maintained non-conductive, and thus first electromagnet M1 remains unexcited. Accordingly, diaphragm actuating lever 7 is retained locked by detecting lever 13, such that if intermediate lever 6 is released to rotate by the releasing operation, diaphragm actuating lever 7 remains locked. With the above-described conditions maintained, when changeover switch S1 is switched to the position shown by the dotted line in FIG. 2, front curtain 1 starts travelling and timing switch S2 is opened. Thus, the scene light passing through objective lens 15 and the fully opened diaphragm exposes film 3, additionally the light rays reflected from the surface of front curtain 1 and film surface 3 are received by second photoconductive element P2. Capacitor C is charged according to the output of second photoconductive element P2. When the voltage of capacitor C reaches a given level, the exposure terminates.

In other words, the above-described operation relates to the case where with the diaphragm being maintained in fully open condition, the shutter speed is automatically controlled.

Figure 3:
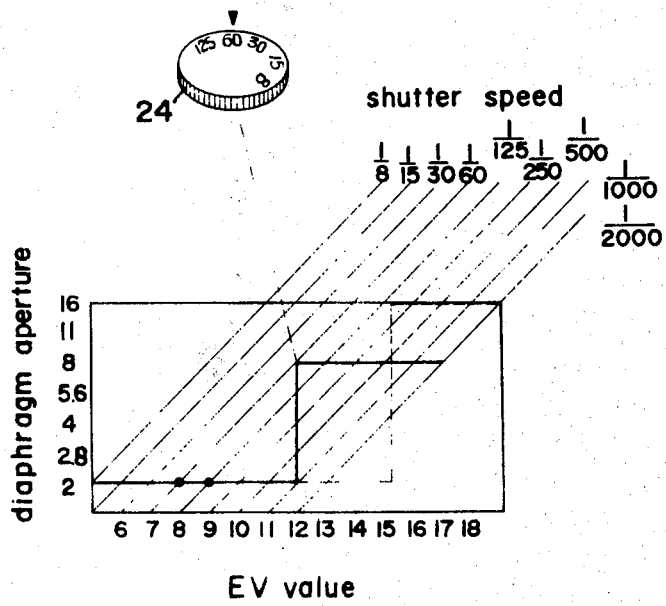
FIG. 3 is a graph showing the values of diaphragm aperture and shutter speed.

FIG. 3 is a graph showing a program relating to an automatic exposure control which is effected in a manner described according to the present invention. The vertical axis represents EV values, the horizontal axis represents the values of the diaphragm aperture, and the oblique lines represent the values of proper shutter speed. Assuming that the preset diaphragm aperture is 16 and the lowest shutter speed is 1/125 second, then there results a program as shown by the dotted line. In this case, when at the EV values ranging from 15 to 18, the diaphragm is set to an aperture value of 16 and the shutter speed is automatically controlled within a range from 1/125 to 1/2000 second. However, if the EV value decreases, a shutter speed lower than 1/125 second is required for the diaphragm value of 16, and hence a proper exposure is not obtained. Accordingly, if the diaphragm is maintained in its fully open position 2, then a shutter speed of 1/125 second is automatically controlled with the EV value being 9. If the EV value is higher than 9, a shutter speed higher than 1/125 second will be automatically controlled. But, if the EV value is lower than 9, a shutter speed lower than 1/125 second will be automatically controlled. In terms of the EV value being 13, a shutter speed of 1/2000 second is automatically controlled at the diaphragm aperture value of 2. If the EV value is 14, it is impossible to provide a proper shutter speed for the fully open diaphragm aperture or for the diaphragm aperture of 16, because of the construction of the shutter. In other words, in case a photographic object presents an EV value of 14, automatic exposure control is impossible. However, it is undesirable to leave the EV value such that automatic exposure control is not possible. For this reason, in the event that an impossible automatic exposure control zone occurs, the aforesaid sliding contact 25a is caused to connect with contacting piece 26, to thereby close the switch consisting of sliding contact 25a and contact 26, thereby providing a warning of such a condition. If such a warning should be given, either the selected shutter speed is decreased by more than one division to for example 1/60 second, or the preset diaphragm aperture may be decreased by more than one division to the aperture value of 11.

The solid line shown in FIG. 3 represents the case where the selected lowest shutter speed is 1/60 second.

Thus, in terms of an EV value in the range from 12 to 17, an exposure time is automatically controlled at the diaphragm aperture of 11 and at the shutter speed in the range from 1/60 to 1/2000. If the EV value is from 8 to 11, an exposure time is automatically controlled at the shutter speed of 1/60 to 1/500 second with the diaphragm aperture being maintained open. Further, if the EV value is lower than 7, an exposure time is automatically controlled at the shutter speed from 1/30 to 1/15 which is lower than the lowest shutter speed selected, with the diaphragm aperture being maintained in the fully open condition.

It is to be understood that the form of the invention herein shown and described is to be taken as a preferred example of the same and that various changes in the shape, size and arrangement of parts are apparent without departing from the spirit of the invention or the scope of the subjoined claims.

What is claimed is:

1. An automatic exposure control device for use in a photographic camera having an adjustable diaphragm aperture, comprising:

diaphragm aperture adjusting means for presetting said diaphragm aperture;

means for selecting the lowest shutter speed at which an exposure will not be effected by vibration of said camera;

a light measuring circuit including a photoconductive element and producing outputs which vary in response to said diaphragm aperture adjusting means and said means for selecting the lowest shutter speed;

detecting means for comparing the level of outputs produced by said light measuring circuit with the level set for a given output and detecting which level is higher;

an electromagnet actuated in response to said detecting means;

a diaphragm actuating member setting said diaphragm aperture from its fully open position to said preset diaphragm aperture prior to the commencement of exposure in association with the release operation;

means for interrupting operation of said diaphragm actuating member in response to said detecting means to retain the diaphragm in its fully open position; and means for controlling the termination of exposure according to the scene light through an objective lens and the diaphragm from a photographic object to be photographed upon the commencement of exposure.

2. An automatic exposure control device as in claim 1, further comprising:

means for selecting the film sensitivity; and means for changing said set level in association with said film sensitivity selecting means.

3. An automatic exposure control device as in claim 1, wherein said light measuring circuit produces the level of outputs corresponding to voltages which are applied through said photoconductive element and a variable resistor whose resistance varies in response to said diaphragm aperture adjusting means and said lowest shutter speed selecting means.

4. An automatic exposure control device as in claim 3, wherein said variable resistor consists of a sliding element and a slidable resistor, said sliding element being rigidly attached to a wire having one end fixedly secured to a member interconnected with said diaphragm aperture adjusting means, so as to interconnect with said diaphragm aperture adjusting means, and said slidable resistor being interconnected with said lowest shutter speed selecting means and being movable by said wire in contacting relation with said sliding element.

5. An automatic exposure control device as in claim 4, further comprising:

a contact mounted on one terminal of said slidable resistor, said terminal being close to the side to which said wire is attached;

a switch consisting of said contact and said sliding element; and an indicator element connected through said switch to a potential source.

6. An automatic exposure control device as in claim 4, further comprising:

a film sensitivity selecting dial;

a pulley rotatably supported in said camera and having a circumference around which is wound said wire having one end fixedly attached to the member interconnected with said diaphragm aperture adjusting means;

a wire take-up shaft having a tendency of taking up the wire therearound, said wire having the other end fixedly attached to said take-up shaft; and a meter provided coaxially and integrally with said take-up shaft and rotatably mounted therewith, said meter having a pointer facing the inside of a view finder of said photographic camera.

7. An automatic exposure control device as in claim 1, further comprising:

an exchangeable lens barrel mounted exchangeably on the camera body and equipped with an objective lens and said diaphragm;

a diaphragm connecting ring mounted rotatably on the camera body and adapted to interconnect with a diaphragm aperture adjusting ring provided on said exchangeable lens barrel with said exchangeable lens barrel mounted on the camera body; and connecting means for interconnecting said diaphragm actuating ring with said exchangeable lens barrel mounted on the camera body.

8. An automatic exposure control device as in claim 1, wherein said light measuring circuit further includes a second photoconductive element, said second photoconductive element controls the termination of exposure and is mounted to confront an exposure frame of the camera and astride the light path extending from the objective lens to said exposure frame.

9. An automatic exposure control device as in claim 8, wherein said second photoconductive element receives light rays of scene light of a photographic object which are reflected from a surface of the front curtain of a focal plane shutter and from the surface of a light sensitive film within said exposure frame, said scene light coming through the objective lens and the diaphragm of the exchangeable lens barrel.

10. An automatic exposure control device as in claim 1, further comprising means for warning that the lowermost shutter speed value selected requires a shutter speed impossible for the camera when the diaphragm aperture is held fully open.

11. An automatic exposure control device as in claim 10 further comprising:

means for setting a preset aperture value, said setting means being coupled with said means for warning to adjust the latter in accordance with the set shutter speed.

12. An automatic exposure control device as in claim 10, wherein said means for warning includes an indicating means and a switch connected in series with each other to an electric power source, said switch including a first contact positioned in accordance with the setting of the preset aperture value and a second contact positioned in accordance with said selection of lowermost shutter speed.

13. An automatic exposure control device as in claim 12 wherein said light measuring circuit further includes a variable resistor, means coupled with said first photoconductive element to form a voltage divider therewith, and a variable resistor comprising a resistance material mounted on a support which is movable in accordance with said setting of film sensitivity, said second contact serves as a movable contact for said variable resistor, and said first contact is mounted on said support adjacent to one end of said resistance material.

* * * * *